(12) United States Patent
Kwon et al.

(10) Patent No.: US 9,332,219 B2
(45) Date of Patent: May 3, 2016

(54) TELEPRESENCE DEVICE

(71) Applicant: Center of Human-Centered Interaction for Coexistence, Seoul (KR)

(72) Inventors: Jounghuem Kwon, Seoul (KR); Bumjae You, Seoul (KR); Shinyoung Kim, Seoul (KR); Kwangkyu Lee, Gyeonggi-do (KR)

(73) Assignee: CENTER OF HUMAN-CENTERED INTERACTION FOR COEXISTENCE, Seoul (KR)

( * ) Notice: Subject to any disclaimer, the term of this patent is extended or adjusted under 35 U.S.C. 154(b) by 0 days.

(21) Appl. No.: 14/437,444

(22) PCT Filed: Nov. 18, 2013

(86) PCT No.: PCT/KR2013/010468
§ 371 (c)(1),
(2) Date: Apr. 21, 2015

(87) PCT Pub. No.: WO2015/034130
PCT Pub. Date: Mar. 12, 2015

(65) Prior Publication Data
US 2015/0281640 A1 Oct. 1, 2015

(30) Foreign Application Priority Data
Sep. 3, 2013 (KR) .......................... 10-2013-0105446

(51) Int. Cl.
*H04N 7/14* (2006.01)
*G06F 3/01* (2006.01)
*H04N 5/232* (2006.01)

(52) U.S. Cl.
CPC .................. *H04N 7/144* (2013.01); *G06F 3/01* (2013.01); *H04N 5/23219* (2013.01); *H04N 5/23222* (2013.01)

(58) Field of Classification Search
CPC .......... H04N 7/15; H04N 7/142; H04N 7/147; H04N 7/157; H04N 7/144; G06F 3/011; G06F 3/013; G06F 17/30244; G06F 3/016; G06F 3/017; G06F 9/00671; Y10S 901/01
USPC .......... 348/14.01, 14.03, 14.05, 14.07, 14.08, 348/14.09
See application file for complete search history.

(56) References Cited

U.S. PATENT DOCUMENTS

2012/0185095 A1* 7/2012 Rosenstein et al. ........... 700/259
2014/0168056 A1* 6/2014 Swaminathan et al. ...... 345/156
(Continued)

FOREIGN PATENT DOCUMENTS

JP  2002-046088  2/2002
JP  2007-293717  11/2007
(Continued)

*Primary Examiner* — Stella L Woo
(74) *Attorney, Agent, or Firm* — Wells St. John P.S.

(57) ABSTRACT

The present invention relates to a telepresence device that is capable of enabling various types of verbal or non-verbal interaction between a remote user and a local user. In accordance with an embodiment, the telepresence device may include a camera combined with direction control means; a projector provided on a top of the camera, and configured such that a direction of the projector is controlled by the direction control means along with a direction of the camera; and a control unit configured to control the direction of the camera by operating the direction control means, to extract an object, at which a remote user gazes, from an image acquired by the camera whose direction has been controlled, to generate a projection image related to the object, and to project the projection image around the object by controlling the projector.

6 Claims, 6 Drawing Sheets

(56) References Cited

U.S. PATENT DOCUMENTS

2014/0232816 A1* 8/2014 Wilson et al. .............. 348/14.08
2014/0277847 A1* 9/2014 Cann et al. ........................ 701/2

FOREIGN PATENT DOCUMENTS

| | | |
|---|---|---|
| JP | 2010-219989 | 9/2010 |
| KR | 10-0611680 | 8/2006 |
| KR | 10-2011-0071220 | 6/2011 |
| KR | 10-2012-0026038 | 3/2012 |
| KR | 10-2012-0051659 | 5/2012 |
| KR | 10-20120090206 | 8/2012 |
| KR | 10-2012-0129293 | 11/2012 |
| KR | 10-2013-0025200 | 3/2013 |
| WO | WO 2010/120407 | 10/2010 |
| WO | WO 2011/014467 | 2/2011 |
| WO | WO 2011/106201 | 9/2011 |

\* cited by examiner

TELEPRESENCE DEVICE

CROSS REFERENCE TO RELATED APPLICATION

This is a 35 U.S.C. §371 application of, and claims priority to, International Application No. PCT/KR2013/010468, which was filed on Nov. 18, 2013, which claims priority to Korean Patent Application No. KR 10-2013-0105446, which was filed on Sep. 3, 2013, the entirety of all the applications are incorporated herein by reference.

TECHNICAL FIELD

The present invention relates, in general, to a telepresence device and, more particularly, to a telepresence device that is capable of enabling various types of verbal or non-verbal interaction between a remote user and a local user.

BACKGROUND ART

Recently, telepresence robots have been used in order to overcome physical distances and also enable social communication between remote users. Since general telepresence robots are focused on verbal communication, such as the transfer of two-dimensional (2D) images and audio, the general telepresence robots are insufficient for efficient social communication. Accordingly, in order to overcome the limitation of physical distances and also increase a sense of coexistence that humans feel when being present together in the same space by using a method for natural social communication between remote users, non-verbal communication is essential.

Korean Patent Application Publication No. 10-2011-0071220 discloses a technology that controls a telepresence robot using robot state information at a remote location. However, this technology has its limitations in terms of the recognition and expression of the non-verbal behavior of a user.

DISCLOSURE

Technical Problem

The present invention is directed to the provision of a telepresence device that is capable of enabling various types of non-verbal interaction, such as the indication of the gaze point of a remote user, the augmentation of information, the sharing of a virtual object and the provision of haptic information, between the remote user and a local user.

Technical Solution

In accordance with an aspect, a telepresence device may include a camera combined with direction control means; a projector provided on a top of the camera, and configured such that a direction of the projector is controlled by the direction control means along with a direction of the camera; and a control unit configured to control the direction of the camera by operating the direction control means, to extract an object, at which a remote user gazes, from an image acquired by the camera whose direction has been controlled, to generate a projection image related to the object, and to project the projection image around the object by controlling the projector.

The control unit may be further configured to determine the gazing direction of the remote user based on gaze information of the remote user, and to activate the direction control means so that the camera is directed toward the gazing direction of the remote user.

The projection image may include one or more of an indicator indicating that the extracted object corresponds to the object at which the remote user gazes, and augmented information regarding the object.

Furthermore, the telepresence device may further include a display configured to output an image of a motion of the remote user; and a motion detection unit configured to detect a motion performed by the local user in response to the motion of the remote user output onto the display.

Furthermore, the telepresence device may further include a movement unit configured to move the telepresence device forward or backward, the movement unit being disposed on the bottom of the telepresence device; and the control unit may be further configured to interpret the motion of the local user, and to control the movement unit and move the telepresence device forward or backward when the motion of the local user has been interpreted as being indicative of a movement of the telepresence device.

Furthermore, the telepresence device may further include a display configured to output a predetermined object that the remote user and a local user want to share; and a motion detection unit configured to detect a motion performed by the local user with respect to the output predetermined object.

In this case, the motion of the local user may include one or more of rotation, movement, enlargement and reduction of the predetermined object; and the control unit may be configured to rotate, move, enlarge or reduce the predetermined object on the display based on the motion of the local user.

Meanwhile, a movement unit may be configured to move the telepresence device in a direction that is a reverse direction of a pushing direction when the local user has pushed the predetermined object on the display.

In this case, the movement unit may be further configured to move the telepresence device in the direction that is a reverse direction of the pushing direction based on rigidity of the predetermined object and magnitude of a pushing force.

In this case, the movement unit may be an inverted pendulum type mobile base that moves based on predetermined information, such as tilt, location and speed.

Advantageous Effects

Interaction with a local user can be performed by precisely displaying an object at which a remote user gazes and also displaying augmented information related to the object by using the telepresence device.

Furthermore, the interaction of sharing and directly manipulating a virtual object can be performed between the local user and the remote user by using the telepresence device.

Furthermore, the haptic information of a virtual object can be displayed to the local user by using the telepresence device.

As described above, the telepresence device can provide non-verbal interaction between the local user and the remote user.

MODE FOR INVENTION

Figure 1:
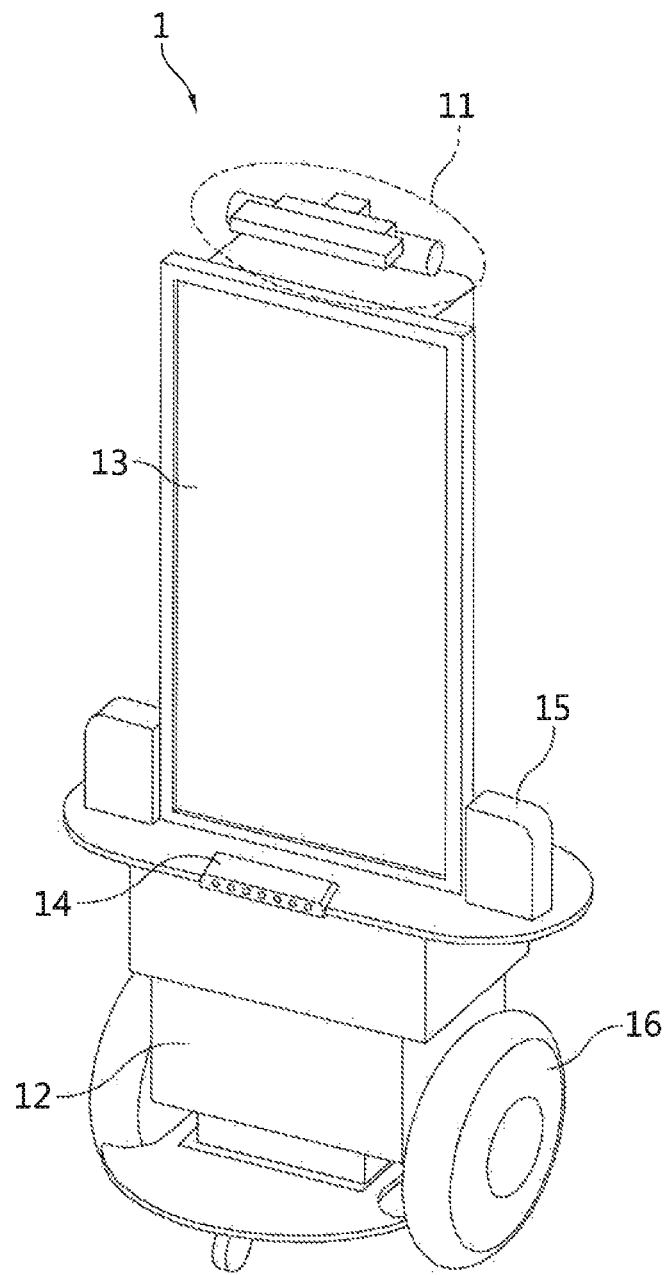
FIG. 1 is a diagram illustrating a telepresence device according to an embodiment of the present invention.

Specific details of other embodiments are included in the detailed description and the drawings. The advantages and features of described technologies and methods of achieving them will be apparent from embodiments that will be described in detail with reference to the accompanying drawings. The same reference numerals denote the same elements throughout the specification.

Embodiments of a telepresence device are described in detail below with reference to the drawings.

Figure 2:
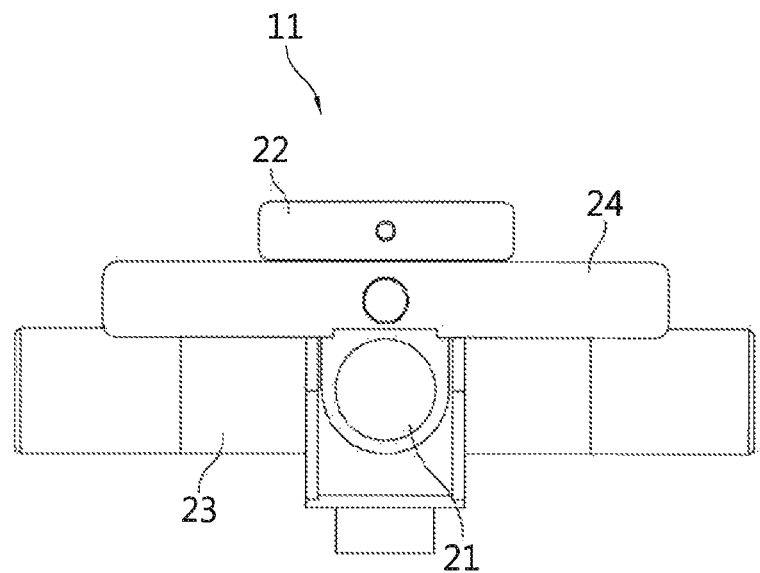
FIG. 2 is a detailed view of the upper end configuration of the telepresence device of FIG. 1.

FIG. 1 is a diagram illustrating a telepresence device according to an embodiment of the present invention. FIG. 2 is a detailed view of the upper end configuration of the telepresence device of FIG. 1.

Referring to FIG. 1, the telepresence device 1 includes an upper end configuration 11, configurations constituting a body, including a control unit 12, a display 13, a motion detection unit 14 and an audio output unit 15, and a movement unit 16.

The upper end configuration 11 functions as the head of the telepresence device 1. Referring to FIG. 2, the upper end configuration 11 may include a camera 21 configured to photograph images, and a projector 22.

The camera 21 is combined with a direction control means 23. The direction of the camera 21 is controlled by the operation of the direction control means 23. In this case, the direction control means 23 may be a 3-axis motor.

When the direction of the camera 21 has been controlled by the operation of the direction control means 23, the camera 21 photographs the front of the direction of the camera 21 and then acquires an image. In this case, the camera 21 may be a three-dimensional (3D) camera that can acquire a 3D color image.

Meanwhile, as illustrated in FIG. 2, a depth camera 24 that can acquire a depth image of a scene may be further included.

As described above, when photographing has been performed using the cameras 21 and 24 that can acquire a 3D color image and a depth image, the geometrical relationship between objects may be extracted from the acquired images.

The projector 22 is attached onto the top of the camera 21. The direction of the projector 22 is controlled along with that of the camera 21 by the operation of the direction control means 23.

When the direction of the camera 21 has been controlled by the direction control means 23 and then the camera 21 has photographed a specific object located in the direction of the camera 21, the projector 22 may project a predetermined projection image onto the specific object. In this case, the predetermined projection image may include an indicator indicated around the specific object and information augmented with respect to the specific object.

The control unit 12 controls the various operations of the elements of the telepresence device 1.

For example, the control unit 12 operates the direction control means 23, and thus controls the direction of the cameras 21 and 24. When the direction of the cameras 21 and 24 has been controlled by operating the direction control means 23, the control unit 12 operates the cameras 21 and 24 and then acquires images of a front in the controlled direction.

When the images have been acquired by the cameras 21 and 24, the control unit 12 may extract an object, at which a remote user gazes, from the acquired image.

In this case, the remote user refers to a user who is located at a remote location physically separate from the telepresence device 1. The local user that will be described below refers to a user who interacts with the telepresence device 1 at a location identical to the physical location of the telepresence device 1.

When the object at which the remote user gazes has been extracted, the control unit 12 generates a projection image related to the object, controls the keystone of the projector 22, and allows a projection image to be projected around the object.

Although the control unit 12 is illustrated as being attached to the bottom of the display 13, this is merely an example, and thus the control unit 12 may be mounted on the rear surface of the display 13.

The display 13 may be attached to the bottom of the upper end configuration 11, and may output various 3D images.

For example, the display 13 may output a 3D image of the remote user received from the remote user. The 3D image of the remote user may be an image of a motion which is performed by the remote user, for example, an image in which the remote user shakes hands with the local user, an image in which the remote user talks to the local user, an image in which the remote user waves his or her hand to the local user, or an image in which the remote user describes an object at which the local user gazes.

Alternatively, the display 13 may output a virtual 3D image of an object that the local user and the remote user want to discuss.

The motion detection unit 14 detects various types of motions that are performed by the local user. As illustrated, the motion detection unit 14 may be attached onto the bottom of the display 13. However, this is merely an example, and the motion detection unit 14 may be attached onto various locations of the display 13, such as the left side, right side and top of the display 13.

In this case, the motion detection unit 14 may include a motion tracker and a camera that are not illustrated. The camera may be a 3D camera that photographs the motion of the local user. The motion tracker may track the motion of the local user in an image of the motion of the local user acquired by the camera.

The audio processing unit 15 may include a microphone that receives the audio of the local user, and a speaker that outputs the audio of the remote user.

The movement unit 16 moves the telepresence device 1 forward or backward by the control of the control unit 12. In this case, the movement unit 16 may be an inverted pendulum-type mobile base that sets information, such as tilt, location or speed, and then moves based on the set information.

Figure 3:
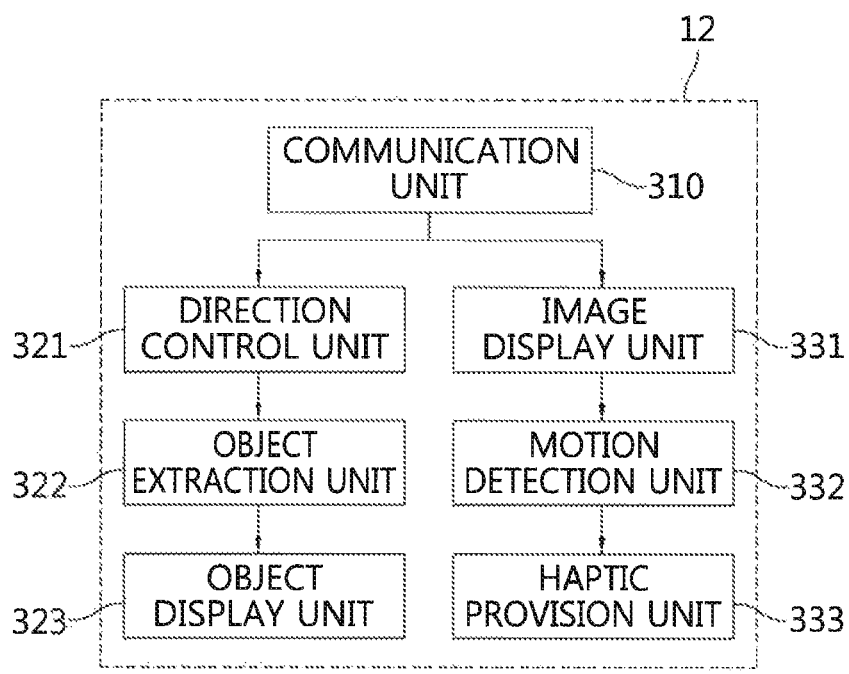
FIG. 3 is a block diagram illustrating the control unit of the telepresence device of FIG. 1.

FIG. 3 is a block diagram illustrating the control unit 12 of the telepresence device 1 of FIG. 1.

The control unit 12 of the telepresence device 1 is described in detail with referring to FIGS. 1 to 3.

The control unit 12 may include a communication unit 310, a direction control unit 321, an object extraction unit 322, an object display unit 323, an image display unit 331, a motion detection unit 332, and a haptic provision unit 333.

The communication unit 310 communicates with a remote user, receives the gaze information of the remote user, a 3D image related to the remote user, etc., and transmits various types of information related to the local user to the remote user.

In this case, the remote user may also include a telepresence device at his or her location, and may communicate the local user via this telepresence device.

The direction control unit 321 may receive gaze information related to an object, at which the remote user gazes, from the remote user, may determine a direction, in which the remote user gazes, using the gaze information, and then may generate direction control information that is used to control the direction of the camera. In this case, the gaze information may include information, such as the angle of upward, downward, leftward or rightward movement with respect to a front or a gazing distance.

The direction control unit 321 generates control information required to move a 3-axis motor, that is, the direction control means 13, based on the gaze information, such as the angle or the gazing distance, and then activates the 3-axis motor.

When the direction control means 13 has been operated and thus the direction of the camera 21 combined with the direction control means 13 has been controlled, the object extraction unit 322 acquires an image of a front in the direction controlled by operating the camera 21. Thereafter, the geometrical relationship between a central object and a surrounding object may be extracted from the acquired image, and then the central object at which the remote user gazes may be determined.

When the object at which the remote user gazes has been determined, the object display unit 323 generates a projection image including a predetermined indicator indicating that the object corresponds to an object at which the remote user gazes. When the projection image has been generated, the projector 22 is controlled and thus the projection image is projected around the object.

Furthermore, the object display unit 323 augments information related to the object, may include the augmented information in the projection image, and then may project the projection image.

Figure 4:
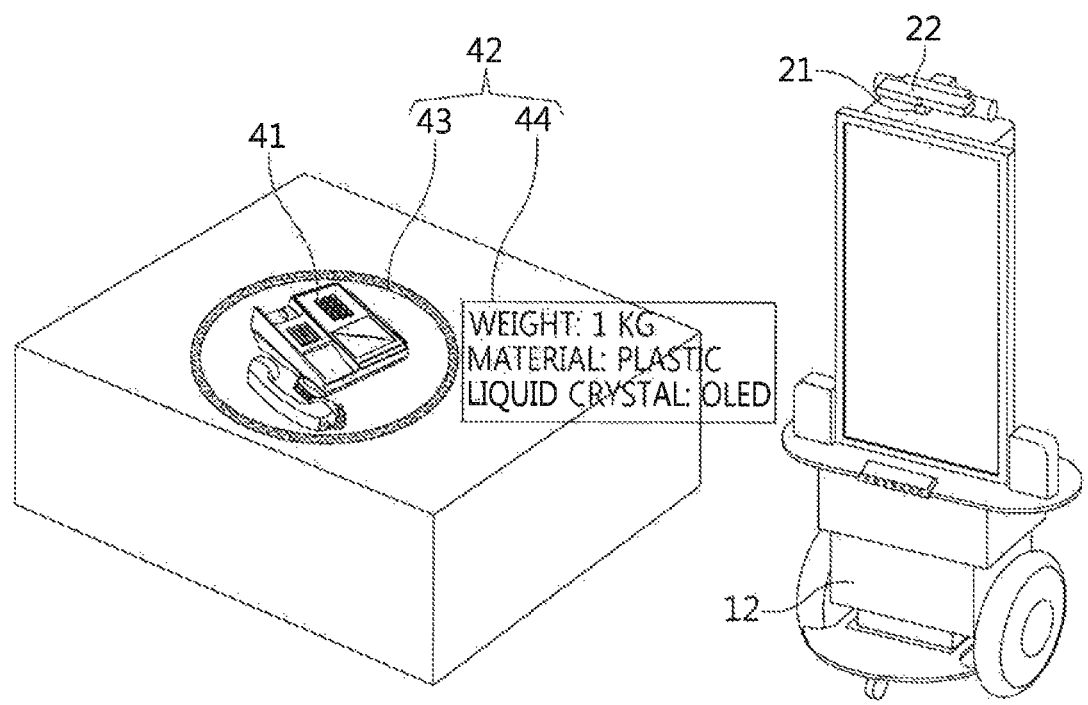
FIGS. 4 to 7 illustrate examples of interaction using the telepresence device according to an embodiment of the present invention.

FIG. 4 is a diagram illustrating a situation in which the telepresence device 1 outputs a projection image around an object at which the remote user gazes according to an embodiment of the present invention.

Referring to FIG. 4, the remote user located at a remote location may determine an object, such as a telephone, a table or the like, located at a local location via the camera 21 of the telepresence device 1.

As described above, the remote user may transmit gaze information, such as a movement angle and a movement distance, to the telepresence device 1 in real time, thereby controlling the direction of the camera 21. Furthermore, the remote user may transmit a control signal so that a projection image 42 can be output when a desired object 41 has been detected from an image that has been acquired and transmitted via the camera 21.

When an object 41 intended by the remote user has been determined as described above, the control unit 12 may generate the projection image 42 including an indicator 43 and augmented information 44 related to the object 41 around the object 41, may control the projector 22, and may project the projection image 42.

As described above, when the object 41 at which the remote user gazes has been determined and then the indicator 43 or the augmented information 44 has been output, the local user may precisely identify the object 41 at which the remote user gazes.

Furthermore, dialogue audios may be output between the remote user or the local user or the dialogue audios may be transmitted to counterparts via the audio processing unit 15 of FIG. 1, and thus a dialog may be made between the remote user and the local user using the object as a subject of the dialog.

When receiving an image of the remote user from the remote user, the image display unit 331 outputs the received image to the display 13. In this case, a 3D image of the remote user may be an image of a motion that is performed by the remote user, for example, an image in which the remote user shakes hands with the local user, an image in which the remote user talks to the local user, an image in which the remote user waves his or her hand to the local user, or an image in which the remote user describes an object at which that the local user gazes.

The motion detection unit 332 detects various types of motions that are performed by the local user. The local user performs a series of motions in order to respond to a motion of the remote user output by the display 13 or touch or manipulate a shared virtual object by hand. The motion detection unit 332 may detect the spatial position values of a hand corresponding to the series of motions.

The haptic provision unit 333 may interpret the detected motion of the local user, and may provide haptic feedback to the local user. For example, when the haptic provision unit 333 has interpreted the motion of the local user as being indicative of the movement of the telepresence device 1, the haptic provision unit 333 may control the movement unit 16 of FIG. 1, and may move the telepresence device 1 forward or backward.

Figure 5:
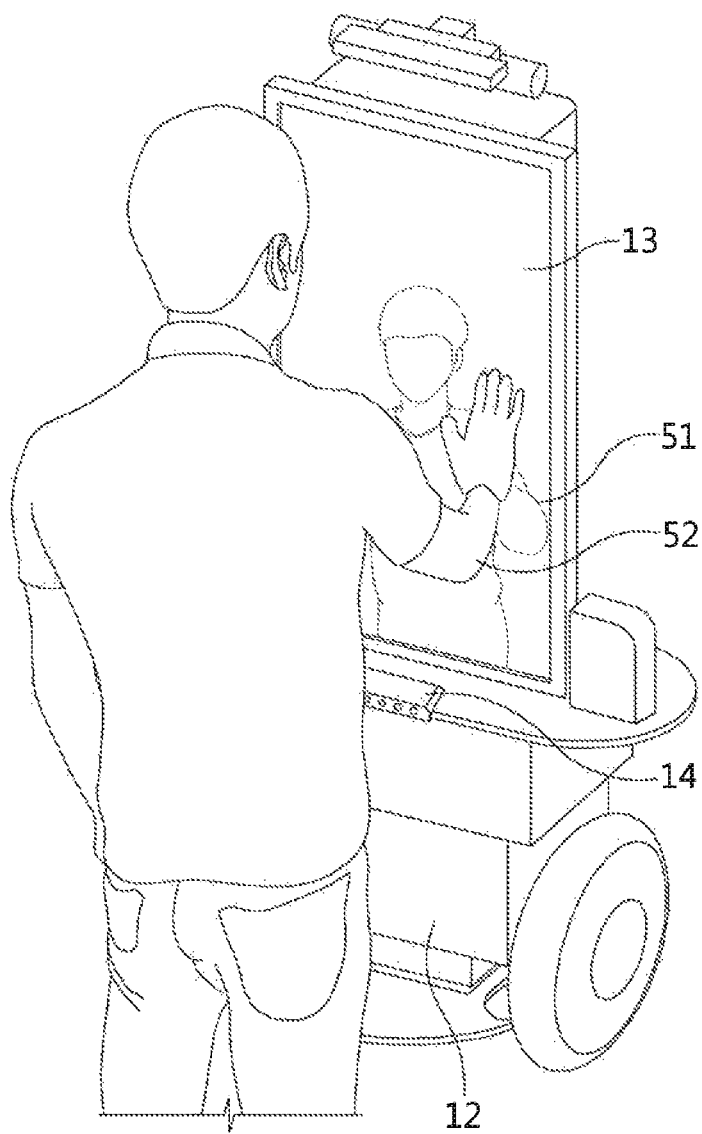

FIG. 5 is a diagram illustrating an example of interaction between the remote user and the local user.

Referring to FIG. 5, when a motion in which the hands of the remote and local users has come into contact or the remote user has shaken hands with the local user has performed, a motion image 51 of the remote user is output onto the display 13. In this case, since the display 13 may output a 3D image, the display 13 may output a motion image of the remote user into which depth has been incorporated.

For example, since a motion image into which the depth has been incorporated is output onto the display 13 when the remote user offers his or her hand in order to shake or contact hands, the local user may feel as if the remote user offers his or her hand to himself or herself.

When the local user has viewed an image 51 output onto the display 13 and then has performed a corresponding motion 52, the motion detection unit 14 may detect the motion 52 of the local user.

In this case, when the control unit 12 has detected the motion 52 of the local user via the motion detection unit 14, the control unit 12 may transmit an image of the motion 52 of the local user to the remote user.

Furthermore, the control unit 12 may provide haptic feedback to the local user according to the motion 52 of the local user. For example, if the local and remote users push and pull their hands in a situation in which the hands of the local and remote users have come into contact with each other or the remote user has shaken hands with the local user, the movement unit 16 may be moved forward or backward in response to pushing and pulling force.

Accordingly, the local user and the remote user may have a feeling, such as the feeling of actual shaking or actual contact between hands, thereby enabling non-verbal interaction.

Meanwhile, the image display unit 331 may generate a virtual 3D image of an object that the local user and the remote user want to share, and may output the generated virtual 3D image onto the display 13. In this case, the image display unit 331 may receive information about the object from the local user or the remote user.

Figure 6:
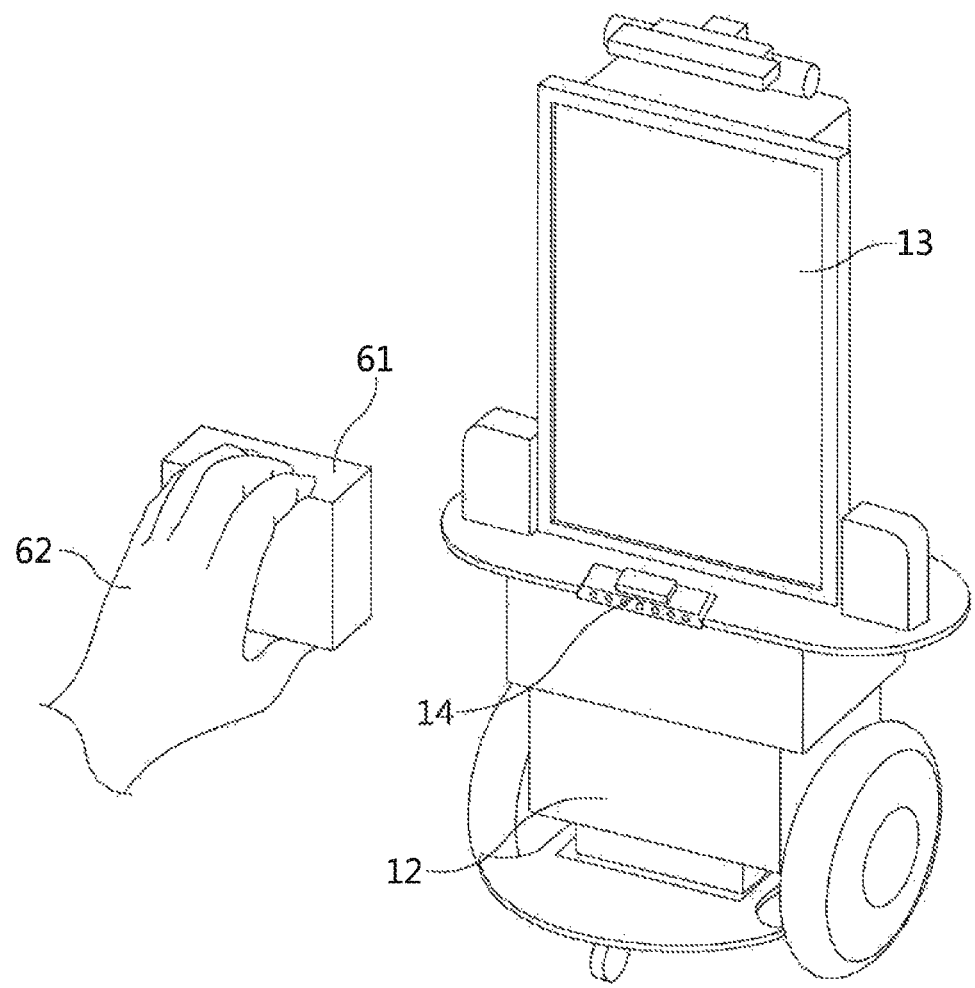

FIG. 6 is a diagram illustrating an example of performing interaction between the local user and the remote user via the manipulation of a 3D object.

Referring to FIG. 6, although the local user has been illustrated as directly holding an object 61 by a hand 62 for ease of description, a virtual object is actually output onto the display 13.

When the virtual object 61 has been output onto the display 13, the local user may perform a motion in which the local user directly holds the virtual object 61 by the hand 62, as illustrated. Furthermore, the local user may perform a motion, such as the rotation, movement, enlargement or reduction of the virtual object 61 in the motion of holding the virtual object 61.

In this case, when the local user has rotated or moved the hand 62, the motion detection unit 14 tracks the shape and location of the hand 62, and the control unit 12 interprets the motion and then rotates or moves the object 61 on the display 13. When the local user has clenched or opened the hand 62 in the motion of holding the virtual object 61, the control unit 12 may interprets this as being indicative of the reduction or enlargement of the object 61, and may reduce or enlarge the object 61 on the display.

Meanwhile, the local user may directly touch the display 13 and then perform a motion, such as the rotation, movement, enlargement or reduction of the object 61.

In this case, the control unit 12 may control the movement unit 16, and then may provide haptic feedback to the local user.

Figure 7:
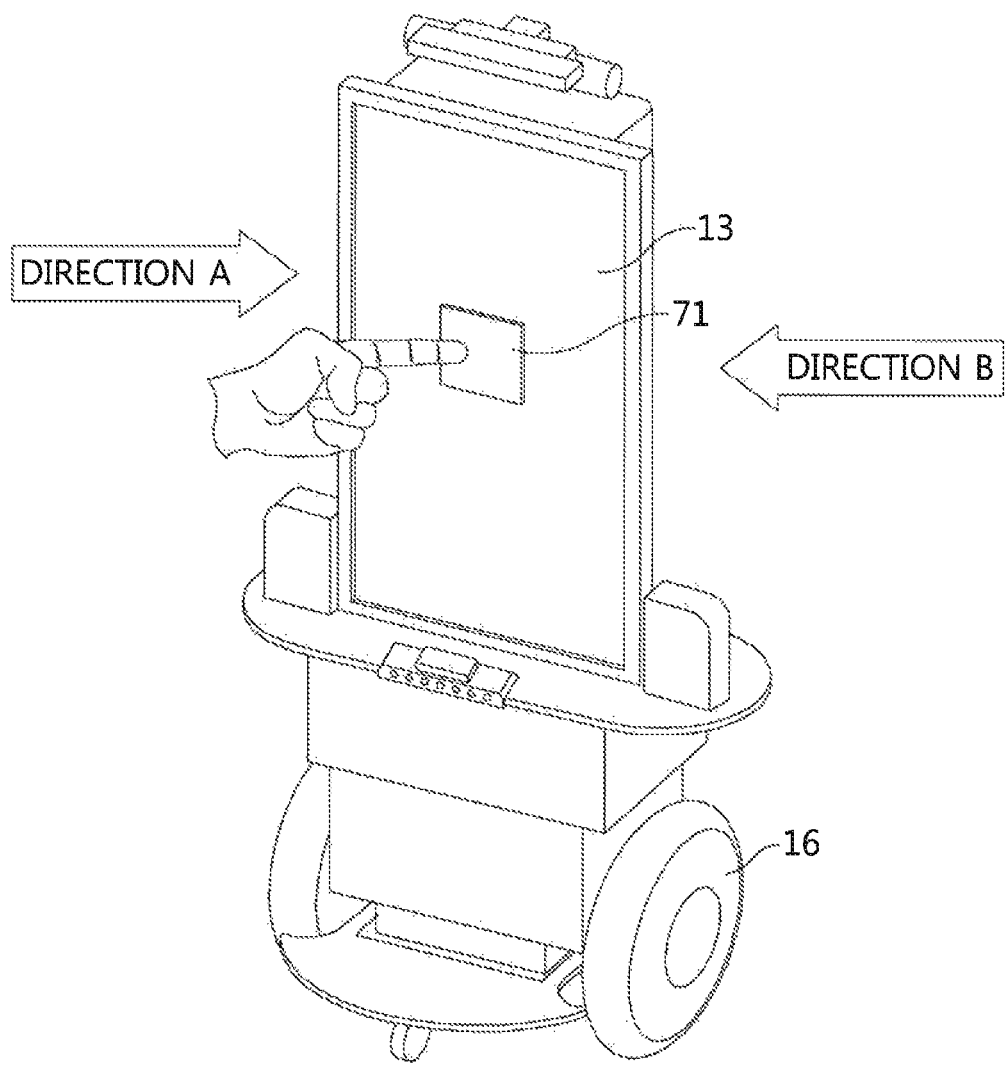

FIG. 7 is a diagram illustrating an example of haptic feedback corresponding to the motion of the local user that is performed on an object 71 that is output onto the display 13.

Referring to FIG. 7, when the local user has pushed the object 71 displayed on the display 13 in direction "A", the movement unit 16 is controlled so that the movement unit 16 is moved in direction "B" that is the reverse direction of a pushing direction. In this case, the control unit 12 may set the tilt, location and speed of the movement unit 16 (for example, an inverted pendulum type mobile base) to 0, thereby returning the inverted pendulum type mobile base to its original location.

As described above, when the tilt, the location and the speed have been set to 0, the inverted pendulum type mobile base is moved in order to adjust the tilt, the location and the speed to 0 if force is externally applied to the inverted pendulum type mobile base. That is, when the local user has pushed the display 13, the telepresence device 1 instantaneously moves backward. In this case, the inverted pendulum type mobile base applies force in the opposite direction and moves in order to return to its original location.

Accordingly, the local user may feel the rigidity of the object 71. That is, if the telepresence device 1 has been easily pushed backward or force acting to return to the original location is weak when the local user has applied force to the display 13, the local user may feel that the rigidity of the object 71 is week. In contrast, when the force acting to return to the original location has been strong and thus the object 71 has not been easily pushed backward, it may be determined that the object 71 has strong rigidity.

As described above, the information of the inverted pendulum type mobile base may be set based on the rigidity of the object 71 or the magnitude of pushing force, thereby providing the feedback of various types of rigidity to the local user.

Those having ordinary knowledge in the art to which the present embodiments pertain can appreciate that the present invention may be practiced without changing the technical spirit or essential features of the present invention. Therefore, it should be appreciated that the embodiments described above are illustrative in all aspects and are not limiting.

The invention claimed is:

1. A telepresence device, comprising:
   a camera combined with direction control means;
   a projector provided on a top of the camera, and configured such that a direction of the projector is controlled by the direction control means along with a direction of the camera;
   a control unit configured to control the direction of the camera by operating the direction control means, to extract an object, at which a remote user gazes, from an image acquired by the camera whose direction has been controlled, to generate a projection image related to the object, and to project the projection image around the object by controlling the projector;
   a display configured to output a predetermined object that the remote user and a local user want to share;
   a motion detection unit configured to detect a motion performed by the local user with respect to the output predetermined object;
   wherein the projection image comprises one or more of an indicator indicating that the extracted object corresponds to the object at which the remote user gazes, and augmented information regarding the object to identify the object at which the remote user gazes by the local user;
   a movement unit configured to move the telepresence device in a direction that is a reverse direction of a pushing direction when the local user has pushed the predetermined object on the display; and
   wherein the movement unit is further configured to move the telepresence device in the direction that is a reverse direction of the pushing, direction based on rigidity of the predetermined object and magnitude of a pushing force.

2. The telepresence device of claim 1, wherein the control unit is further configured to determine a gazing direction of the remote user based on gaze information of the remote user, and to activate the direction control means so that the camera is directed toward the gazing direction of the remote user.

3. The telepresence device of claim 1, wherein:
   the display outputs an image of a motion of the remote user; and
   the motion detection unit detects a motion performed by the local user in response to the motion of the remote user output onto the display.

4. The telepresence device of claim 3, wherein:
   the telepresence device further comprises the movement unit configured to move the telepresence device forward or backward, the movement unit being disposed on the bottom of the telepresence device; and
   the control unit is further configured to interpret the motion of the local user, and to control the movement unit and move the telepresence device forward or backward when the motion of the local user has been interpreted as being indicative of a movement of the telepresence device.

5. The telepresence device of claim 1, wherein:
   the motion of the local user comprises one or more of rotation, movement, enlargement and reduction of the predetermined object; and
   the control unit is configured to rotate, move, enlarge or reduce the predetermined object on the display based on the motion of the local user.

6. The telepresence device of claim 1, wherein the movement unit is an inverted pendulum type mobile base that moves based on predetermined tilt, location and speed information.

\* \* \* \* \*